United States Patent
Iwata et al.

(10) Patent No.: US 6,903,048 B2
(45) Date of Patent: Jun. 7, 2005

(54) METHOD FOR PRODUCING HYDRO-REFINING CATALYST

(75) Inventors: Yoshiki Iwata, Toda (JP); Chikanori Nakaoka, Toda (JP); Yasuhito Goto, Toda (JP)

(73) Assignee: Japan Energy Corporation, Tokyo (JP)

(*) Notice: Subject to any disclaimer, the term of this patent is extended or adjusted under 35 U.S.C. 154(b) by 0 days.

(21) Appl. No.: 10/482,041

(22) PCT Filed: Jun. 27, 2002

(86) PCT No.: PCT/JP02/06474
§ 371 (c)(1),
(2), (4) Date: Dec. 29, 2003

(87) PCT Pub. No.: WO03/002253
PCT Pub. Date: Jan. 9, 2003

(65) Prior Publication Data
US 2004/0186013 A1 Sep. 23, 2004

(30) Foreign Application Priority Data
Jun. 27, 2001 (JP) .......................... 2001-193828

(51) Int. Cl.$^7$ .............................. B01J 27/19
(52) U.S. Cl. ................... 502/211; 502/208; 502/213
(58) Field of Search ................ 502/208, 211, 502/213

(56) References Cited
FOREIGN PATENT DOCUMENTS

| | | |
|---|---|---|
| EP | 341893 A2 | 11/1989 |
| EP | 0 494 528 A1 | 7/1992 |
| EP | 1090682 A1 | 4/2001 |
| EP | 1 172 141 A1 | 1/2002 |
| JP | 2-14745 A | 1/1990 |
| JP | 6-31176 A | 2/1994 |
| JP | 6-106063 A | 4/1994 |
| JP | 7-136523 A | 5/1995 |
| JP | 8-243407 A | 9/1996 |
| JP | 9-500815 A | 1/1997 |
| JP | 2000-511820 A | 9/2000 |
| JP | 2001-104790 A | 4/2001 |
| WO | WO 97/47385 A1 | 12/1997 |
| WO | WO 00/62924 A1 | 10/2000 |

*Primary Examiner*—Elizabeth D. Wood
(74) *Attorney, Agent, or Firm*—Birch, Stewart, Kolasch & Birch, LLP

(57) ABSTRACT

A method for producing a hydrorefining catalyst has the steps of preparing an impregnation solution containing molybdenum, phosphorus, cobalt and/or nickel, and citric acid, bringing a carrier into contact with the impregnation solution, and then calcinating the carrier in an oxidizing atmosphere at a temperature at which citric acid is removed. In the impregnation solution, a molar ratio of molybdenum/phosphorus is 6 to 13, a molar ratio of (cobalt and nickel)/phosphorus is 0.5 to 7, and a molar ratio of (cobalt and nickel)/citric acid is 0.5 to 2. As for the hydrorefining catalyst obtained by this method, the activity of the catalyst is high, and the catalyst life is long.

10 Claims, 7 Drawing Sheets

US 6,903,048 B2

METHOD FOR PRODUCING HYDROREFINING CATALYST

TECHNICAL FIELD

The present invention relates to a method for producing a hydrorefining catalyst to be used, for example, for desulfurization and denitrogenation of hydrocarbon oil such as petroleum. In particular, the present invention relates to a method for impregnation of hydrogenation-active metal.

BACKGROUND ART

Hydrorefining catalysts have been hitherto produced such that an active metal, which has, for example, a demetallation ability and a hydrogenation ability, is impregnated on a carrier composed of porous inorganic oxide such as alumina. The hydrorefining is performed such that hydrocarbon oil is brought into contact with the hydrorefining catalyst in the presence of hydrogen, in which it is possible to remove hetero elements contained in the hydrocarbon oil, i.e., sulfur, nitrogen, and metal components (for example, vanadium, nickel, and iron). Various investigations have been made for such a catalyst concerning, for example, the active metal, the property of the carrier, the pore structure, and the method for impregnating the active metal in order to improve the ability to remove the hetero elements.

As for the method for impregnating the metal, Japanese Patent Application Laid-Open No. 9-500815 discloses a method in which a carrier is impregnated with an impregnation solution containing cobalt acetate and phosphomolybdic acid to perform vacuum drying at 160° C. In this method, the catalyst is not calcinated. Japanese Patent Application Laid-Open No. 6-31176 discloses a catalyst composition having a hydrotreating activity and containing a catalyst which does not substantially contain free water and which includes salt and/or complex of metal belonging to the VIII group and heteropolyacid of metal belonging to the VI group supported on a support substance of inorganic oxide. It is described that citrate may be used as conjugate base for acid which constitutes the salt of metal belonging to the VIII group. However, in this method, the catalyst composition is not calcinated.

WO97/47385 (Japanese Patent Application Laid-Open No. 2000-511820) discloses a method for impregnating a carrier with an impregnation solution dissolved with a solid obtained by evaporating and drying a solution containing phosphomolybdic acid, cobalt carbonate, and citric acid, followed by being calcined at 400° C. in a nitrogen atmosphere. In this method, it is necessary to firstly prepare an aqueous solution of a compound represented by a general formula $M_xAB_{12}O_{40}$ (M is cobalt and/or nickel, A is selected from phosphorus, silicon, and boron, B is molybdenum and/or tungsten, and x is not less than 2 when A is phosphorus). Subsequently, the aqueous solution is treated with a reducing agent. More specifically, crystalline phosphomolybdic acid $H_3PMo_{12}O_{40} \cdot 13H_2O$ is dissolved in water, to which a $COCO_3$ solution, citric acid as a buffer, and metal cobalt as a reducing agent are added to prepare a dark blue solution. After that, this solution is evaporated and dried to recover a bulk solid corresponding to $Co_{7/2}PMo_{12}O_{40} \cdot xH_2O$. Subsequently, this solid is dissolved in water to obtain the impregnation solution thereby (Example 1). On the contrary, in the present invention, it is unnecessary to prepare the specified compound represented by the general formula described above when the impregnation solution is prepared, and it is unnecessary to perform the treatment with the reducing agent.

DISCLOSURE OF THE INVENTION

An object of the present invention is to provide a catalyst having a more excellent activity by improving a composition of an impregnation solution to be used for producing the hydrorefining catalyst and improving the calcinating step to be performed thereafter. Especially, an object of the present invention is to provide a catalyst which has high desulfurization performance and which is suitable for hydrorefining of heavy oil or middle distillate products.

In order to achieve the foregoing objects, the present inventors have diligently made studies. As a result, it has been found out that a catalyst having excellent desulfurization performance can be prepared such that a carrier, which has been brought into contact with an impregnation solution containing cobalt and/or nickel, molybdenum, phosphorus, and citric acid in a specified ratio, is calcinated so that citric acid is removed.

That is, according to the present invention, there is provided a method for producing a hydrorefining catalyst containing cobalt and/or nickel, molybdenum, and phosphorus by bringing an impregnation solution into contact with a carrier composed of inorganic porous oxide, the method comprising:

preparing, without using any reducing agent, the impregnation solution containing cobalt and/or nickel, molybdenum, phosphorus, and citric acid in which a molar ratio of molybdenum/phosphorus is 6 to 13, a molar ratio of ((total amount of) cobalt and nickel)/phosphorus is 0.5 to 7, and a molar ratio of (cobalt and nickel)/citric acid is 0.5 to 2;

bringing the carrier into contact with the impregnation solution; and calcinating the carrier having been brought into contact with the impregnation solution, in an oxidizing atmosphere at a temperature at which citric acid is removed.

It is preferable that a Raman spectroscopy spectrum of the impregnation solution has a peak top between 940 cm$^{-1}$ to 950 cm$^{-1}$, and it is preferable that the Raman spectroscopy spectrum has a peak top between 970 cm$^{-1}$ to 980 cm$^{-1}$. It is preferable that a $^{31}$P-NMR spectrum of the impregnation solution has a peak at not less than 0.4 ppm provided that a chemical shift value of $H_3PO_4$ is 0 ppm. It is preferable that the catalyst contains molybdenum by a metal element weight of 3 to 20% by weight, cobalt and nickel by a metal element weight of 1 to 8% by weight, and phosphorus by a phosphorus element weight of 0.05 to 5% by weight. Especially, it is preferable that a molar ratio of molybdenum/phosphorus in the impregnation solution is 6.5 to 11.5. The impregnation solution, which is obtained by the process of the method of the present invention, is characterized in that the impregnation solution is green to red, and specifically the impregnation solution has a wavelength region in which the transmittance is not less than 90% at wavelengths of not less than 450 nm in the ultraviolet-visible spectrum. Owing to the characteristic of the ultraviolet-visible spectrum, the impregnation solution of the present invention can be distinguished from impregnation solutions prepared by the conventional methods. When the impregnation solution is green, the transmittance is not less than 90% at wavelengths of 500 to 550 nm. When the impregnation solution is red, the transmittance is not less than 90% at wavelengths of 650 to 700 nm.

In the method of the present invention, the impregnation solution may be prepared, for example, with phosphomolybdic acid and citrate of cobalt and/or nickel. The impregnation solution may be prepared with phosphomolybdic acid, citric acid, and carbonate of cobalt and/or nickel. Alternatively, the impregnation solution may be prepared with molybdenum trioxide; phosphoric acid; and citrate of cobalt and/or nickel. Further alternatively, the impregnation solution may be prepared with 12-molybdo(VI)phosphoric acid hydrate; and citrate of cobalt and/or nickel.

BEST MODE FOR CARRYING OUT THE INVENTION

Carrier

Figure 1:
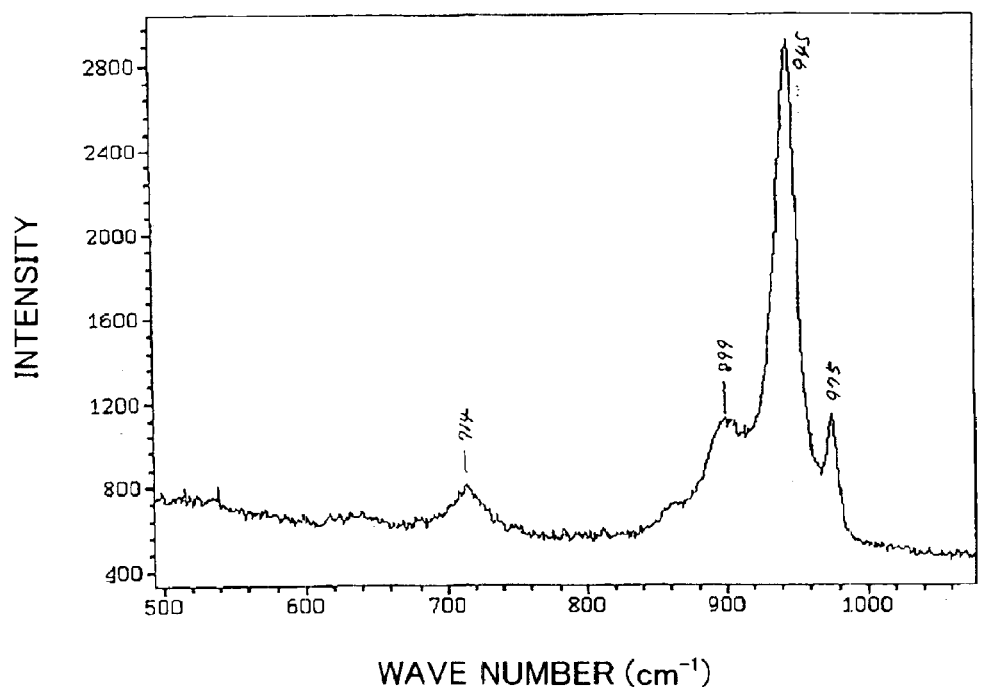
FIG. 1 shows a chart illustrating Raman spectroscopy for Impregnation solution 9039.
Figure 2:
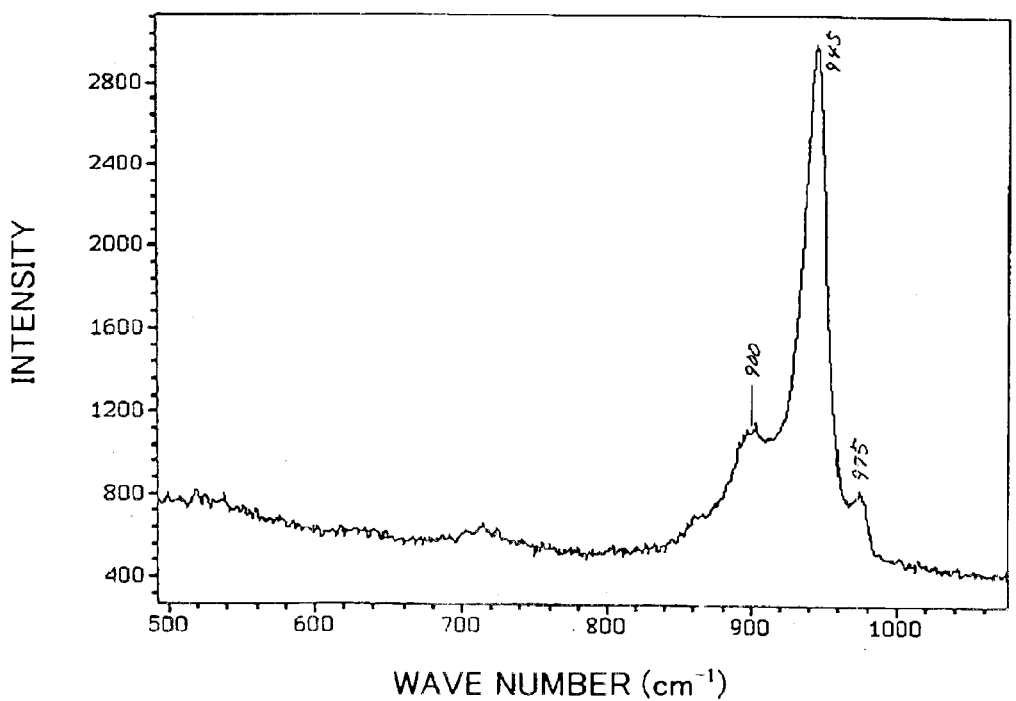
FIG. 2 shows a chart illustrating Raman spectroscopy for Impregnation solution 9063.

In general, as for the carrier to be used for the catalyst, no trouble arises in any case provided that the carrier is prepared from inorganic materials used for the catalyst carrier. Those usable for the carrier include, for example, those composed of oxides of elements belonging to the groups II, III, and IV of the periodic table. Especially, it is possible to use, for example, at least one of oxides of silica, alumina, magnesia, zirconia, boria, titania, calcia, and zinc oxide. Among them, it is preferable to use those composed of, for example, alumina (having any one of crystal structures of, for example, α, γ, δ, η, and χ), silica-alumina, silica, alumina-magnesia, silica-magnesia, and alumina-silica-magnesia, and especially those composed of γ-alumina. No trouble occurs in the use, for example, when the shape of the catalyst is any one of spherical, cylinder, trilobe, and quadrilobe shapes.

The properties of the carrier can be appropriately adjusted depending on the feed oil to be refined by using the hydrorefining catalyst. The following properties are preferred for the carrier to be used for the hydrorefining catalyst for the middle distillate products such as fractions of kerosene, gas oil, and vacuum gas oil. The specific surface area, which is measured by the nitrogen gas adsorption method, is 100 to 400 m$^2$/g, and especially preferably not less than 200 m$^2$/g. The pore volume is 0.3 to 1 cm$^3$/g, and especially preferably not less than 0.5 cm$^3$/g. The median pore diameter is 3 to 20 nm, and especially preferably 4 to 12 nm. In this specification, the middle distillate products refer to the fractions for which the 50% distillation temperature is less than 480° C. Usually, the 90% distillation temperature for the middle distillate products is not more than 580° C.

The following properties are preferred for the carrier to be used for the hydrorefining catalyst for the heavy oil. The specific surface area, which is measured by the nitrogen gas adsorption method, is preferably 100 to 400 m$^2$/g, and especially preferably not less than 150 m$^2$/g. The pore volume, which is measured by the nitrogen gas adsorption method, is preferably 0.3 to 1 cm$^3$/g, and especially preferably not less than 0.5 cm$^3$/g. The median pore diameter is preferably 3 to 20 nm, and especially preferably 7 to 12 nm. In this specification, the heavy oil refers to the fraction containing not less than 1% of the conradson carbon content, which includes, for example, the atmospheric distillation residue and the vacuum distillation residue.

Impregnation Solution

The impregnation solution, which is used for the present invention, contains molybdenum, phosphorus, and cobalt or nickel, and it further contains citric acid. The molar ratio of molybdenum/phosphorus in the impregnation solution is 6 to 13, and preferably 6.5 to 11.5. The molar ratio of (cobalt and nickel)/phosphorus in the impregnation solution is 0.5 to 7. The molar ratio of (cobalt and nickel)/citric acid is 0.5 to 2. It is preferable that the molar ratio of molybdenum/phosphorus, the molar ratio of (cobalt and nickel)/phosphorus, and the molar ratio of (cobalt and nickel)/citric acid in the impregnation solution are regulated depending on the way of use of the hydrorefining catalyst to be produced in accordance with the method of the present invention.

For example, when a hydrorefining catalyst to be used for refining the middle distillate products is produced, the molar ratio of molybdenum/phosphorus in the impregnation solution is preferably 8 to 13, more preferably 9 to 12, and especially preferably 11 to 11.8. Further, the molar ratio of (cobalt and nickel)/phosphorus in the impregnation solution is preferably 2.5 to 7, and especially preferably 3 to 6. The molar ratio of (cobalt and nickel)/citric acid is preferably 0.7 to 2, and especially preferably 1 to 1.7.

For example, when a hydrorefining catalyst to be used for refining the heavy oil is produced, the molar ratio of molybdenum/phosphorus in the impregnation solution is preferably 6.5 to 10.5. The molar ratio of (cobalt and nickel)/phosphorus in the impregnation solution is preferably 2.0 to 6.5, and especially preferably 3.0 to 6. The molar ratio of (cobalt and nickel)/citric acid is preferably 0.6 to 2, and especially preferably 1 to 1.8.

Molybdenum can be added to the impregnation solution as a compound of, for example, oxide, ammonium salt, and chloride. The concentration of molybdenum is preferably 0.1 to 6 moles/liter, and especially preferably 0.2 to 3 moles/liter. Cobalt and nickel can be added to the impregnation solution as compounds of, for example, organic acid salts such as carbonate, nitrate, chloride, and citrate. The total concentration of cobalt and nickel is preferably 0.05 to 3 moles/liter, and especially preferably 0.1 to 2 moles/liter. Cobalt or nickel may be used singly. Alternatively, cobalt and nickel may be used simultaneously. Phosphorus can be added to the impregnation solution as a compound of, for example, phosphoric acid, phosphorous acid, ammonium phosphate, and phosphomolybdic acid. The concentration of phosphorus is preferably 0.01 to 2 moles/liter, and especially preferably 0.05 to 1 moles/liter. Citric acid may be added to the impregnation solution in a form of any compound. However, it is preferable to add citrate or metal citrate. For example, nickel citrate and cobalt citrate can be preferably used as the metal citrate. Citric acid functions to stabilize the impregnation solution. Especially, in the method of the present invention, citric acid guards a complex including molybdenum during the period until nickel and/or cobalt, molybdenum, and phosphorus are impregnated on the carrier, and then citric acid is removed by means of the calcination. Within the scope of the present invention, it is allowable to add, to the impregnation solution, for example, a water-soluble polymer such as polyethylene glycol and polyvinyl alcohol. However, it is undesired to add to the impregnation solution a reducing agent or an oxidizing agent such as hydrogen peroxide and permanganate.

When a catalyst to be used for effecting the hydrorefining of the heavy oil is produced, it is preferable that the impregnation solution has a peak in the vicinity of 945 cm$^{-1}$ (940 to 950 cm$^{-1}$) in the Raman spectroscopy spectrum. It is considered that the peak is not based on molybdophosphoric acid ion, but the peak is based on the complex (anion) containing cobalt and/or nickel, molybdenum, and phosphorus. Owing to the fact that phosphorus forms the complex together with cobalt and/or nickel and molybdenum in the impregnation solution as described above, phosphorus is hardly adsorbed by aluminum which forms the carrier when the carrier is brought into contact with the impregnation solution, and thus phosphorus can penetrate into the central portion of the carrier. Accordingly, phosphorus is uniformly distributed in the carrier, and it is possible to prolong the catalyst life. The fact that phosphorus is not in a free state and it forms the complex can be also confirmed by measuring the $^{31}$P-NMR spectrum of the impregnation solution. It is known that a peak appears in the vicinity of 0 ppm in the $^{31}$P-NMR spectrum if phosphorus exists in a free state without forming any chemical bond in the impregnation solution provided that the chemical shift value of $H_3PO_4$ is 0 ppm. On the contrary, a peak appears at a position of not less than 0.4 ppm in the case of the impregnation solution prepared by the method of the present invention. Phosphorus in a free state refers to phosphorus presented in aqueous solution in the form of phosphate ion ($PO_4^{3-}$).

When a catalyst to be used for effecting the hydrorefining of the middle distillate products is produced, it is preferable that the impregnation solution has a peak in the vicinity of 945 cm$^{-1}$ (940 to 950 cm$^{-1}$) in the Raman spectroscopy spectrum. More preferably, the impregnation solution has a peak in the vicinity of 945 cm$^{-1}$ (940 to 950 cm$^{-1}$), and it desirably has a peak in the vicinity of 975 cm$^{-1}$ (970 to 980 cm$^{-1}$).

It is preferable that the $^{31}$P-NMR spectrum of the impregnation solution to be used for the hydrorefining catalyst employed for the middle distillate products has a peak at a position of not less than 0.4 ppm provided that the chemical shift value of $H_3PO_4$ is 0 ppm. More preferably, the $^{31}$P-NMR spectrum has a peak at a position of not less than 10 ppm. Much more preferably, the $^{31}$P-NMR spectrum has a peak at a position of not less than 20 ppm, especially not less than 40 ppm and not more than 100 ppm.

Metal Impregnation Method

In the present invention, the calcination is performed at a temperature at which citric acid is removed in the oxidizing atmosphere after bringing the carrier into contact with the impregnation solution as described above. Those used as the method for making the contact include those known, for example, as the pore-filling method and the immersion method. Especially, the pore-filling method is preferably used. In the pore-filling method, the impregnation solution is uniformly brought into contact with the carrier, for example, by means of a method in which the impregnation solution, which has a volume (volume 0.2 to 5-fold the pore volume) approximately equivalent to the pore volume, is formed into mist to make contact with the carrier.

The calcination is performed under a condition in which citric acid is oxidized and it is removed from the carrier. An atmosphere, which sufficiently contains air or oxygen, is used as the oxidizing atmosphere. No carbon remains in the catalyst by calcinating the carrier brought into contact with the impregnation solution in the oxidizing atmosphere. Usually, carbon of not more than 0.2% by weight remains in the catalyst. The calcination is performed within a temperature range of 400° C. to 800° C., preferably 400 to 600° C., and especially preferably 450 to 550° C. It is preferable that the time required to raise the temperature up to the calcination temperature is 10 to 240 minutes, and the time required to maintain the calcination temperature is 1 to 240 minutes. Preferably, drying is performed before the calcination. The drying is performed for 10 minutes to 240 hours usually within a temperature range of 50 to 180° C. and preferably within a temperature range of 80 to 150° C.

Hydrorefining Catalyst

The preferred composition of the catalyst obtained by the present invention includes molybdenum by a metal element weight of 3 to 20% by weight and especially 7 to 18% by weight, cobalt and nickel by a metal element weight of 1 to 8% by weight and especially 2 to 5% by weight, and phosphorus by a phosphorus element weight of 0.05 to 5% by weight and especially 0.2 to 3% by weight. Organic matters such as citric acid are contained by a carbon element weight of not more than 0.5% by weight and especially not more than 0.2% by weight.

The ratio of the respective impregnated components in the catalyst obtained by the present invention is uniform in the catalyst, in which the dispersion performance of phosphorus is especially excellent. The distribution of phosphorus is hardly changed by the calcination to be performed thereafter, because phosphorus forms a compound together with aluminum in the carrier after impregnating the carrier with the impregnation solution. However, in the present invention, phosphorus is homogeneously distributed in the carrier, because phosphorus forms the complex in the impregnation solution as described above. Specifically, the standard deviation of the content ratio in a minute area can be within 25% and especially within 20%. The standard deviation of the content ratio can be determined as follows. That is, the composition ratio is analyzed in a range for a beam diameter of 5 to 50 μm by means of a quantitative analysis technique for the composition for a minute surface such as EPMA. The line scan analysis is performed in the cross section of the catalyst of the composition ratio to determine the value of the standard deviation. The standard deviation of the content ratio can be determined as a value obtained by dividing the determined value of the standard deviation by the average value.

In the case of a catalyst to be used for the hydrorefining of the middle distillate products, the following feature may be appropriately adopted. That is, the specific surface area of the catalyst, which is measured by the nitrogen gas adsorption method, is 50 to 350 m$^2$/g and more preferably 150 to 300 m$^2$/g, the pore volume is 0.1 to 1 cm$^3$/g and more preferably 0.3 to 0.8 cm$^3$/g, and the median pore diameter is 3 to 20 nm and more preferably within a range of 4 to 12 nm.

In the case of a catalyst to be used for the hydrorefining of the heavy oil, the following feature may be appropriately adopted. That is, the specific surface area of the catalyst, which is measured by the nitrogen gas adsorption method, is 50 to 350 m$^2$/g and more preferably 150 to 300 m$^2$/g, the pore volume is 0.1 to 1 cm$^3$/g and more preferably not less than 0.3 cm$^3$/g, and the median pore diameter is 3 to 20 nm and more preferably within a range of 7 to 20 nm.

Those usable for the shape of the catalyst include cylinder, spherical, and tablet shapes. Especially, it is preferable to use the cylinder shape. The cross-sectional shape of the cylinder one may be any one of circular, trilobe, and quadrilobe shapes. As for the dimension of the cross section, it is possible to use a diameter of 0.1 mm to 10 mm. However, it is preferable to use a diameter of 0.7 to 3 mm. The catalyst is subjected to a sulfurization treatment by bringing the catalyst into contact with a sulfur-containing compound before the use. The sulfur-containing compound to be used includes, for example, carbon disulfide, dimethyl disulfide, butyl mercaptan, and dimethyl mercaptan. The sulfurization treatment is performed before packing the reactor with the catalyst or after packing the reactor with the catalyst.

Hydrorefining

The catalyst, which is obtained by the present invention, can be used for the hydrorefining starting from the feed oil including, for example, straight run or cracking-based middle distillate products, naphtha, kerosene, vacuum gas oil, heavy oil, and residue. The catalyst is preferably used for the feed oil of the straight run or cracking-based middle distillate products. The catalyst is also preferably used for the feed oil of the heavy oil such as atmospheric distillation residue and vacuum distillation residue.

The hydrorefining condition for the catalyst obtained by the present invention can be appropriately selected from the following ranges. That is, the reaction temperature is 250 to 500° C. and more preferably 300 to 450° C., the reaction pressure is 1 to 30 MPa/cm$^2$ and more preferably 3 to 20 MPa/cm$^2$, the hydrogen flow rate is 50 to 5000 L/L and more preferably 100 to 2000 L/L in a hydrogen/oil ratio, and the liquid hourly space velocity (LHSV) is 0.1 to 10/hour and more preferably 0.2 to 5/hour.

EXAMPLES

The present invention will be explained in more detail below with reference to Examples. However, the scope of the present invention is not limited to Examples.

Preparation of Impregnation solution

Ion exchange water was added to a solution of phosphomolybdic acid (NPM-40) produced by Nippon Inorganic Colour & Chemical Co., Ltd. and nickel citrate: Ni$_3$(C$_6$H$_5$O$_7$)$_2$.14H$_2$O produced by Kanto Chemical Co., Ltd. The materials were dissolved by performing heating and agitation for 20 minutes to prepare impregnation solutions (Impregnation solution 9039, Impregnation solution 9063, Impregnation solution 9064, Impregnation solution 9066, Impregnation solution 9069, and Impregnation solution 9070) each having a volume approximately equivalent to the pore volume of the carrier. 85% by weight of phosphoric acid produced by Kanto Chemical Co., Ltd. was further added to Impregnation solution 9064. As for each of Impregnation solution 9072 and Impregnation solution 9075, ion exchange water was added to a solution of phosphomolybdic acid (NPM-40) produced by Nippon Inorganic Colour & Chemical Co., Ltd. and citric acid C$_6$H$_8$O$_7$.H$_2$O produced by Kanto Chemical Co., Ltd., and the materials were dissolved by performing heating and agitation for 20 minutes, to which nickel carbonate: NiCO$_3$.2Ni(OH)$_2$.4H$_2$O produced by Wako Pure Chemical Industries, Ltd. was added, and the materials were dissolved by performing heating and agitation to prepare a impregnation solution having a volume approximately equivalent to the pore volume of the carrier. Table 1 summarizes the weights (g unit) of phosphomolybdic acid, nickel citrate, phosphoric acid, nickel carbonate, and citric acid of each of the impregnation solutions, the molar ratio, pH, and the color of the impregnation solution.

TABLE 1

| Impregnation sol. component/sample | #9039 | #9063 | #9064 | #9066 | #9069 | #9070 | #9072 | #9075 |
|---|---|---|---|---|---|---|---|---|
| Phosphomolybdic acid | 45.0 | 44.7 | 44.8 | 44.9 | 43.7 | 44.0 | 44.2 | 44.2 |
| Nickel citrate | 11.9 | 13.6 | 13.7 | 15.3 | 7.5 | 9.7 | — | — |
| Phosphoric acid | — | — | 0.45 | — | — | — | — | — |
| Citric acid | — | — | — | — | — | — | 6.0 | 12.0 |
| Nickel carbonate | — | — | — | — | — | — | 5.5 | 5.5 |
| Mo/P | 9.3 | 9.3 | 6.9 | 9.2 | 9.2 | 9.2 | 9.3 | 9.4 |
| Ni/P | 4.2 | 4.6 | 3.5 | 5.2 | 2.7 | 3.5 | 3.7 | 3.7 |
| Ni/citric acid | 1.5 | 1.5 | 1.5 | 1.5 | 1.5 | 1.5 | 1.5 | 0.8 |
| pH | 2.1 | 2.8 | 2.4 | 3.0 | 1.9 | 2.6 | 1.4 | 0.9 |
| Color of impregnation solution | dark green | dark green | dark green | dark green | dark green | dark green | dark green | dark green |

125.0 g of molybdenum trioxide produced by Taiyo Koko Co., Ltd. and 8.3 g of phosphoric acid produced by Kanto Chemical Co., Ltd. were added to 450 ml of ion exchange water, and the materials were dissolved while performing agitation at 80° C. for 2 hours. The precipitate was filtrated to obtain a solution. 12.0 g of nickel citrate produced by Kanto Chemical Co., Ltd. was dissolved in 93.9 ml of the obtained solution by performing heating and agitation for 90 minutes to prepare Impregnation solution 3429. Impregnation solution 3429 was dark green. In the solution, the molar ratio of molybdenum/phosphorus was 7.3, the molar ratio of nickel/phosphorus was 3.2, the molar ratio of nickel/citric acid was 1.5, and pH was 2.4.

50 g of ion exchange water was added to 34.7 g of 12-molybdo(VI)phosphoric acid n-hydrate (containing 47.8% by weight of Mo element and 13.6% by weight of phosphorus element) produced by Kanto Chemical Co., Ltd., and the materials were dissolved by performing agitation for 10 to 20 minutes. Further, 18.2 g of cobalt citrate: $Co_3(C_6H_5O_7)_2 \cdot 14H_2O$ (containing 21.7% by weight of Co element) produced by Junsei Chemical Co., Ltd. was added, followed by performing agitation for 10 to 20 minutes to prepare impregnation solutions (Impregnation solutions #8584 and #8585). Table 2 summarizes the weights (g unit) of 12-molybdo(VI)phosphoric acid n-hydrate and cobalt citrate, the molar ratio, pH, and the color of the impregnation solution for each of Impregnation solutions.

TABLE 2

| Impregnation solution component/sample | #3429 | #8584 | #8585 |
|---|---|---|---|
| 12-Molybdo(VI)phosphoric acid n-hydrate | — | 34.7 | 34.7 |
| Cobalt citrate | — | 18.2 | 18.2 |
| Nickel citrate | 12.0 | — | — |
| Molybdenum trioxide | 125.0 | — | — |
| Phosphoric acid | 8.3 | — | — |
| Mo/P | 7.3 | 11.4 | 11.4 |
| Co/P or Ni/P | 3.2 | 4.4 | 4.4 |
| Co/citric acid or Ni/citric acid | 1.5 | 1.5 | 1.5 |
| pH | 2.4 | 1.9 | 1.9 |
| Color of impregnation solution | dark green | dark red | dark red |

Evaluation of Impregnation Solution
(1) UV-VIS Absorption Spectrum

Figure 13:
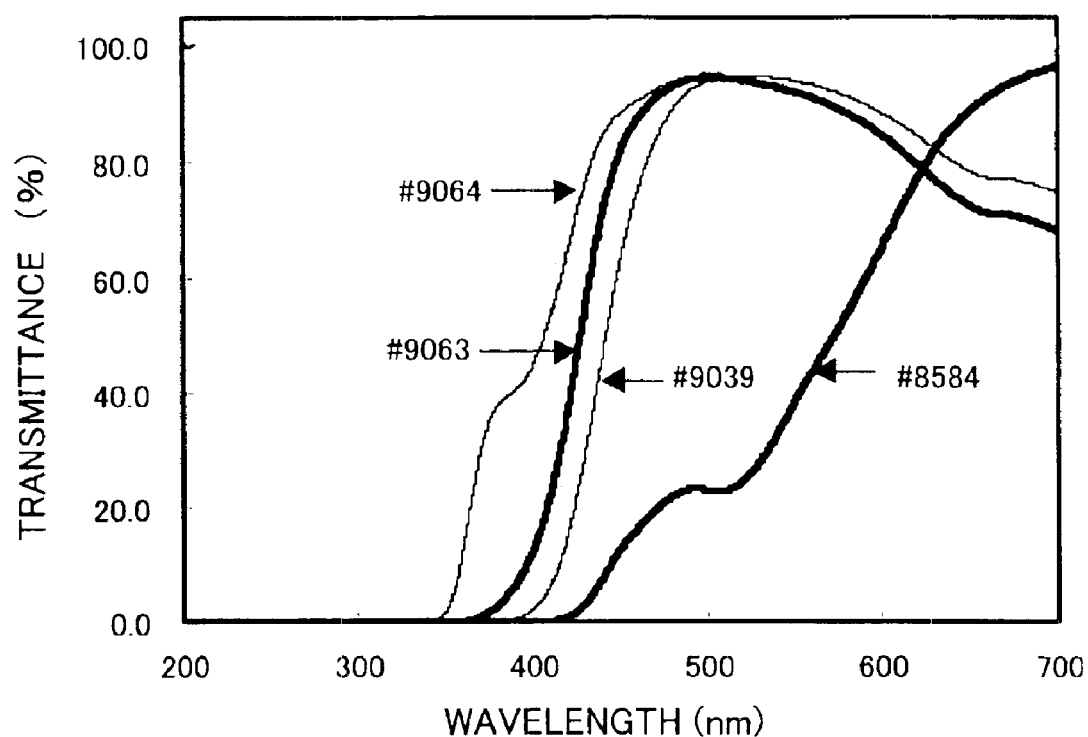
FIG. 13 shows a chart illustrating ultraviolet-visible spectrums of Impregnation solutions 9039, 9063, 9064, and 8584.

Ultraviolet-visible (UV-VIS) absorption spectrum analysis was carried out for Impregnation solutions #9039, 9063, 9064, and 8584. As for Impregnation solutions #9039, 9063, and 9064, as shown in FIG. 13, the transmittance was not less than 90% at wavelengths of 483 to 591 nm for Impregnation solution #9039, the transmittance was not less than 90% at wavelengths of 471 to 570 nm for Impregnation solution #9063, and the transmittance was not less than 90% at wavelengths of 458 to 569 nm for Impregnation solution #9064, in which the color was green. On the other hand, the transmittance was not less than 90% at wavelengths of not less than 654 nm for Impregnation solution #8584, in which the color was red. The ultraviolet-visible absorption spectrums were measured by using a U-3410 type spectrophotometer produced by Hitachi, Ltd. (wavelength range: 200 to 700 nm, cell: 0.5 mm quartz cell, reference: $H_2O$).

(2) Measurement of Raman Spectrum

Impregnation solutions were evaluated by means of the Raman spectroscopy. Microscopic Raman of the SYSTEM-1000 type produced by RENISHAW was employed to perform the measurement by using an He—Ne laser, in which the resolution was 2 $cm^{-1}$, the measurement spot was 10 $\mu m+$, and the exposure time was 60 seconds. Results of the measurement for Impregnation solutions #9039, 9063, 9064, 9072, and 8584 are shown in FIGS. 1 to 5 respectively.

Figure 3:
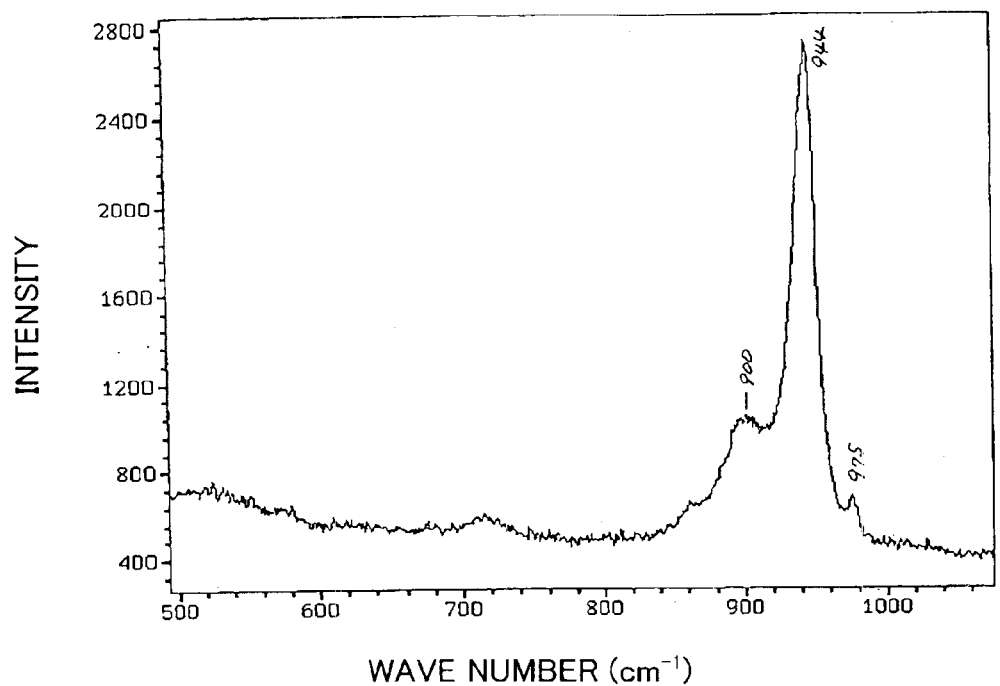
FIG. 3 shows a chart illustrating Raman spectroscopy for Impregnation solution 9064.
Figure 4:
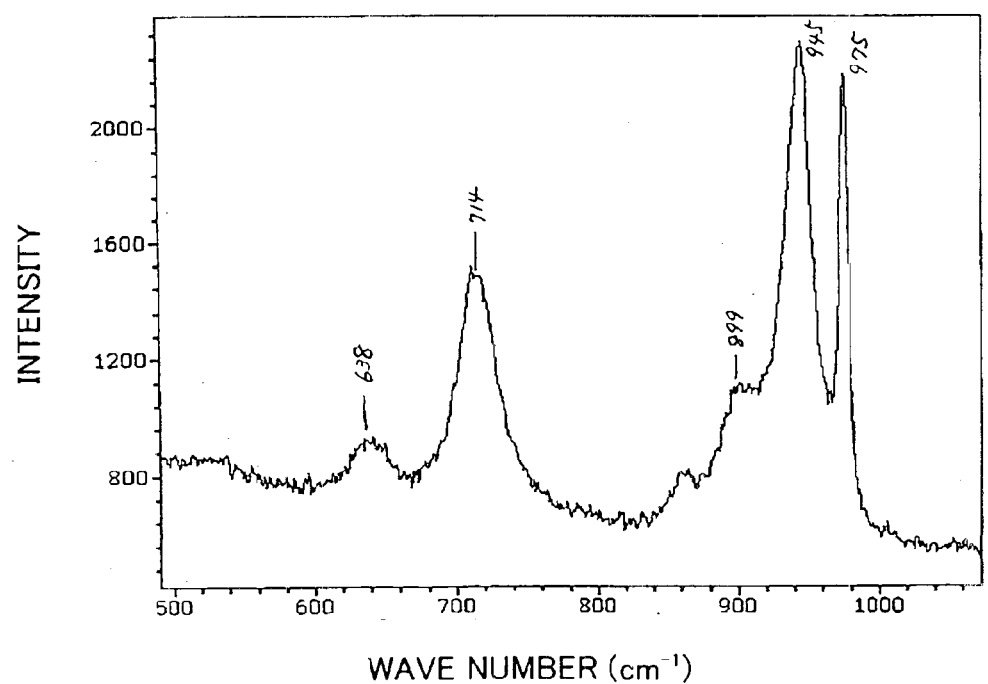
FIG. 4 shows a chart illustrating Raman spectroscopy for Impregnation solution 9072.
Figure 5:
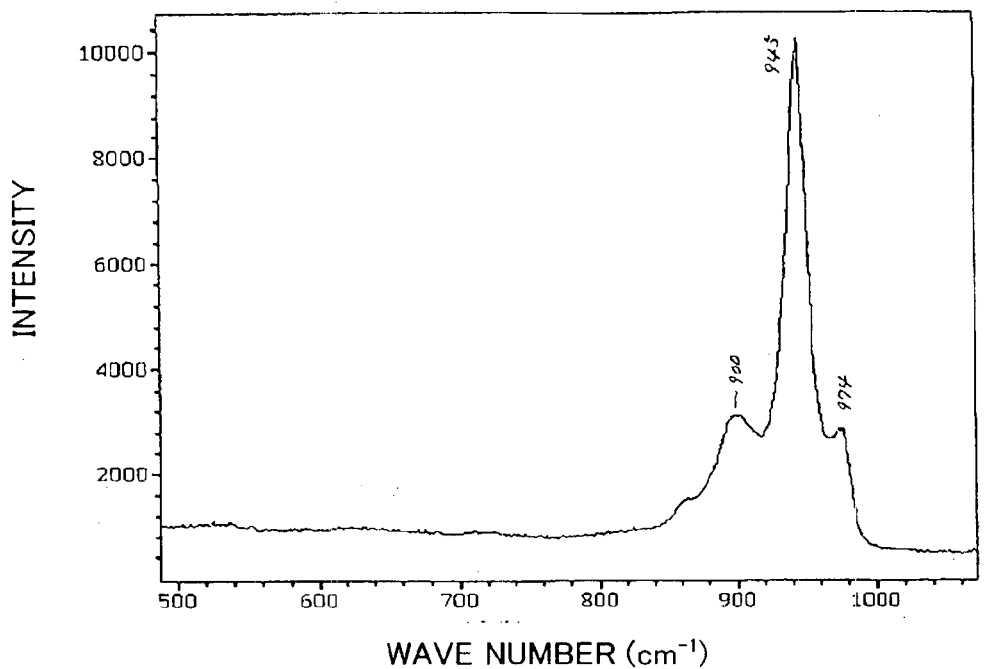
FIG. 5 shows a chart illustrating Raman spectroscopy for Impregnation solution 8584.
Figure 6:
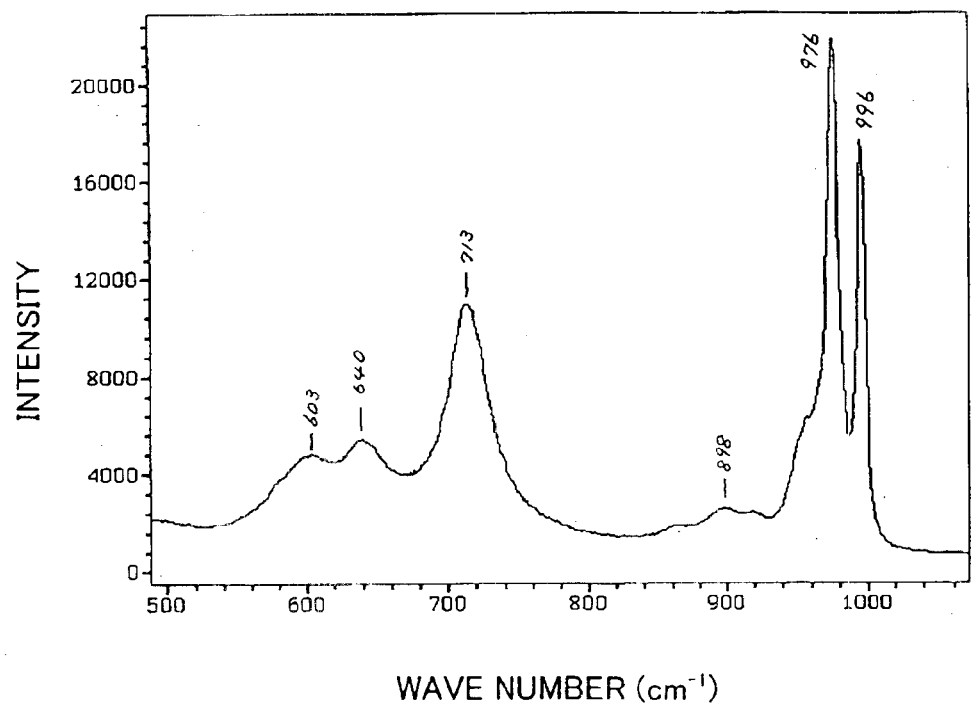
FIG. 6 shows a chart illustrating Raman spectroscopy for a phosphomolybdic acid solution.

For the purpose of comparison, FIG. 6 shows a Raman spectroscopy spectrum of a solution of phosphomolybdic acid (NPM-40) produced by Nippon Inorganic Colour & Chemical Co., Ltd. Peaks were observed for the phosphomolybdic acid solution at 603, 640, 714, 898, 976, and 996 $cm^{-1}$. Peaks were observed at 714, 900, 945, and 975 $cm^{-1}$ for any one of Impregnation solutions #9039 (FIG. 1), 9063 (FIG. 2), and 9064 (FIG. 3). In the case of Impregnation solution #9072, peaks were observed at 638, 714, 899, 945, and 975 $cm^{-1}$. In the case of Impregnation solution #8584 (FIG. 5), peaks were observed at 900, 945, and 974 $cm^{-1}$. It is deemed that the peak around 900 $cm^{-1}$ is identified to $MoO_4^{2-}$ anion. When the spectrums shown in FIGS. 1 to 5 are compared with the spectrum shown in FIG. 6, it is appreciated that a new peak appeared at 940 to 950 $cm^{-1}$ as a result of the addition of nickel citrate or citric acid and nickel carbonate to the phosphomolybdic acid solution at the ratio within the predetermined range.

According to J. A. Rob Van Veen et. al., J. Chem. Soc. Dalton Trans., 1825 (1986), it is known that anions in forms of $[PMO_{12}O_{40}]^{3-}$, $[P_2Mo_{18}O_{62}]^{6-}$, $[PMo_9O_{31}(OH)_3]^{6-}$, $[PMo_{11}O_{39}]^{7-}$, $[P_2Mo_5O_{23}]^{6-}$, and $[PMo_6O_{25}]^{9-}$ are present for the phosphomolybdic acid ion. It has been reported that the respective anions exhibit the Raman spectroscopy peaks as shown in the following table. Therefore, judging from the spectrum shown in FIG. 6, the anions of $[PMO_{12}O_{40}]^{3-}$ and $[P_2MO_{18}O_{62}]^{6-}$ are present in a mixed manner for the phosphomolybdic acid solution (NPM-40).

| Anion | Mo/P (mol/mol) | Raman spectroscopy peak ($cm^{-1}$) |
|---|---|---|
| $[PMo_{12}O_{40}]^{3-}$ | 12 | 995 |
| $[P_2Mo_{18}O_{62}]^{6-}$ | 9 | 980 |
| $[PMo_9O_{31}(OH)_3]^{6-}$ | 9 | 967 |
| $[PMo_{11}O_{39}]^{7-}$ | 11 | 963, 970 |
| $[P_2Mo_5O_{23}]^{6-}$ | 3.5 | 935 |
| $[PMo_6O_{25}]^{9-}$ | 6 | 950 |

According to the judgment of the belonging of the peak positions of the anions described above, it is considered that the peak in the vicinity of 945 $cm^{-1}$ of the peaks appeared for the respective impregnation solutions resides in a complex (anion) formed by the coordination of Ni or Co with respect to $[P_2Mo_5O_{23}]^{6-}$ or $[PMo_6O_{25}]^{9-}$. It is considered that the peak in the vicinity of 975 $cm^{-1}$ resides in a complex (anion) formed by the coordination of Ni or Co with respect to $[PMo_{11}O_{39}]^{7-}$, $[P_2Mo_{18}O_{62}]^{6-}$, or $[PMo_9O_{31}(OH)_3]^{6-}$. On the other hand, any peak in the vicinity of 995 $cm^{-1}$ was not observed for any of the impregnation solutions. Therefore, it is considered that the anion in the form of $[PMo_{12}O_{40}]^{3-}$ is not present in any of the impregnation solutions. Judging from the molar ratio of Mo/P=12 between molybdenum and phosphorus, it is considered that the anion in the form of $[PMo_{12}O_{40}]^{3-}$ corresponds to the anion of the compound disclosed in WO97/47385 described in the section of the background art.

(3) NMR Analysis

Figure 7:
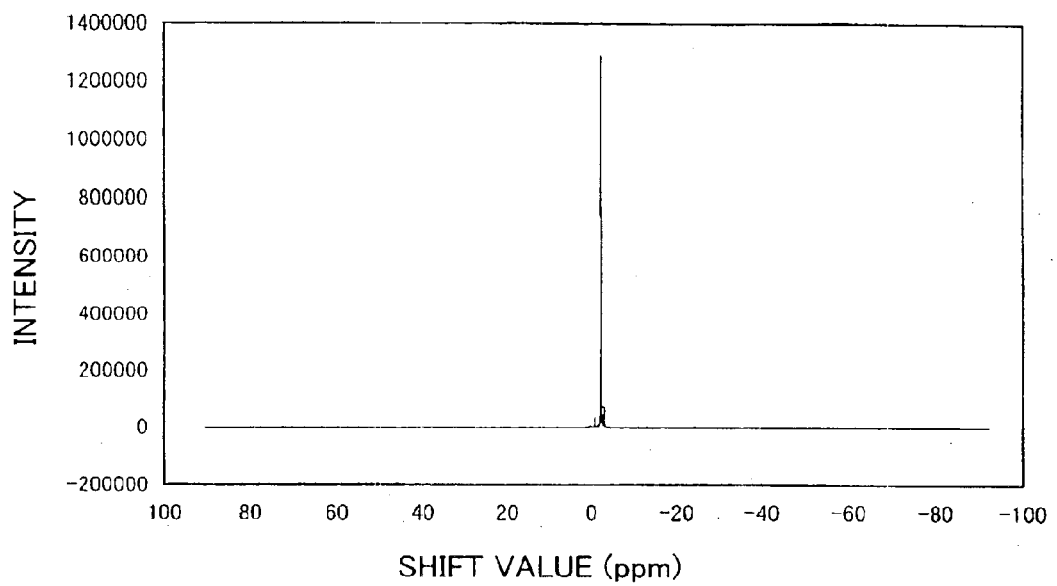
FIG. 7 shows a chart illustrating $^{31}$P-NMR for a phosphomolybdic acid solution.

The impregnation solutions were evaluated by means of $^{31}P$-NMR. A nuclear magnetic resonance apparatus (109.4 MHz) of the GSX-270 type produced by JEOL Ltd. was used with an external standard substance of 85% by weight of $H_3PO_4$ (chemical shift value: 0 ppm). The formulated sample solution was placed in a sample tube of 10 mmφ for NMR, and the measurement was performed by means of the $^1H$ gated decoupling method. The measurement range was 20,000 Hz, the pulse width was 45°, and the waiting time was 5 seconds. FIG. 7 shows an NMR spectrum of the phosphomolybdic acid solution (NPM-40) produced by Nippon Inorganic Colour & Chemical Co., Ltd. Four signals were found at −3.0 ppm, −2.4 ppm, −0.9 ppm, and 0.2 ppm. Especially, the signal at −2.4 ppm had high intensity.

Figure 8:
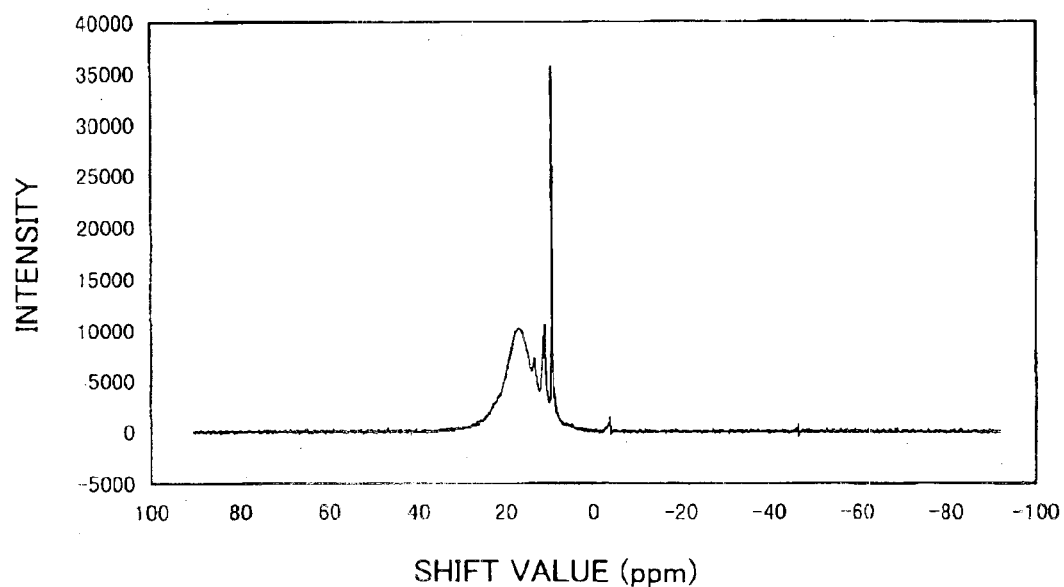
FIG. 8 shows a chart illustrating $^{31}$P-NMR for Impregnation solution 9039.

FIG. 8 shows a result of the measurement of an NMR spectrum of Impregnation solution #9039. In the case of Impregnation solution 9039, the following features are appreciated. That is, sharp signals were found at 9.5, 11.0, 11.5, and 13.4 ppm. Especially, the signal at 9.5 ppm had high intensity. A broad spectrum was found at about 17.1 ppm, probably for the following reason. That is, the complex including molybdenum, nickel and phosphorus was formed as a result of the addition of nickel citrate to the phosphomolybdic acid solution. Further, free phosphorus, which had appeared in FIG. 7, was scarcely present in the impregnation solution.

Figure 9:
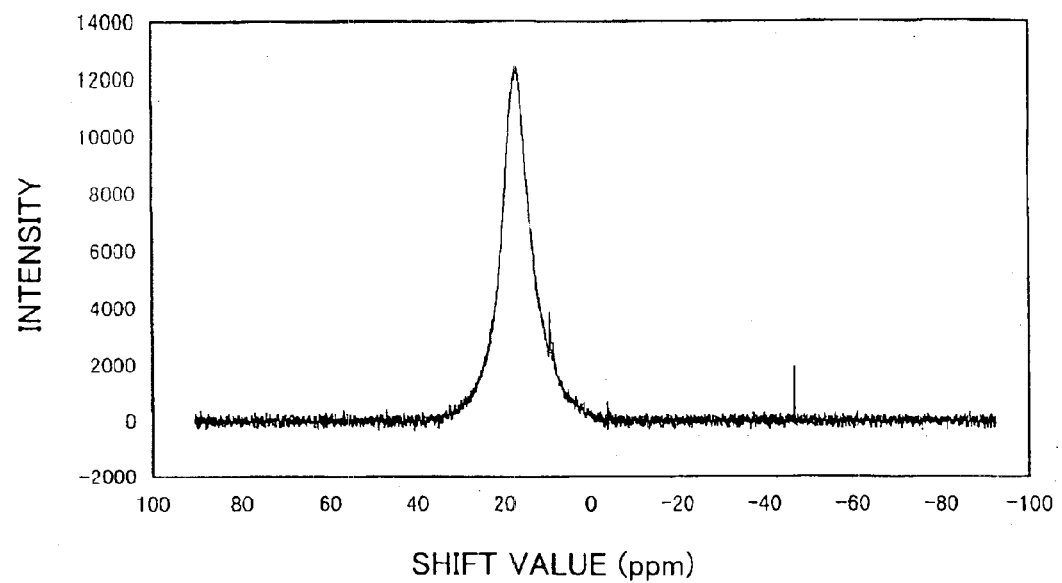
FIG. 9 shows a chart illustrating $^{31}$P-NMR for Impregnation solution 9064.
Figure 10:
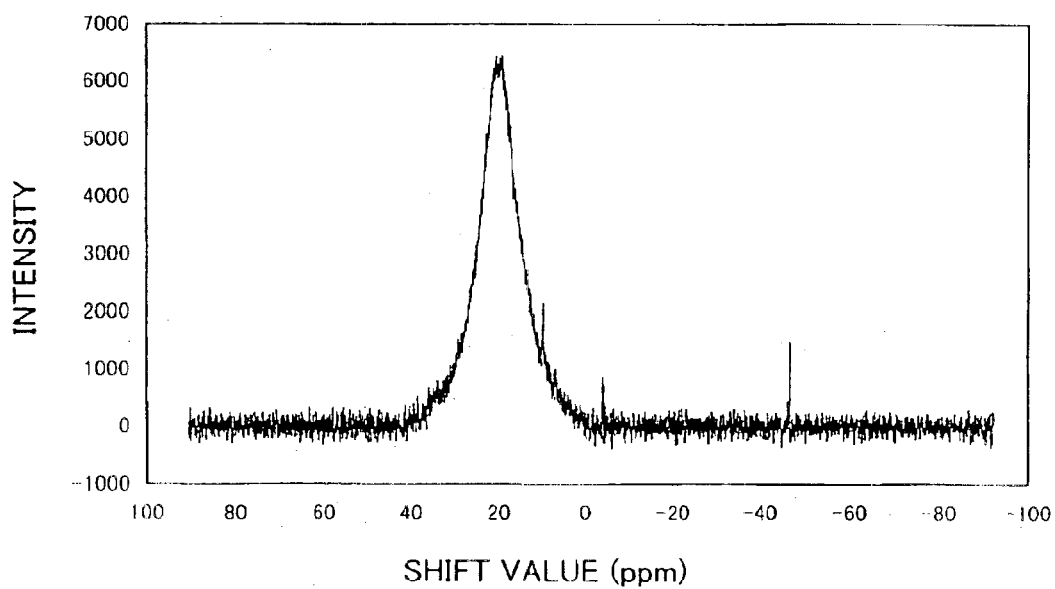
FIG. 10 shows a chart illustrating $^{31}$P-NMR for Impregnation solution 9066.
Figure 11:
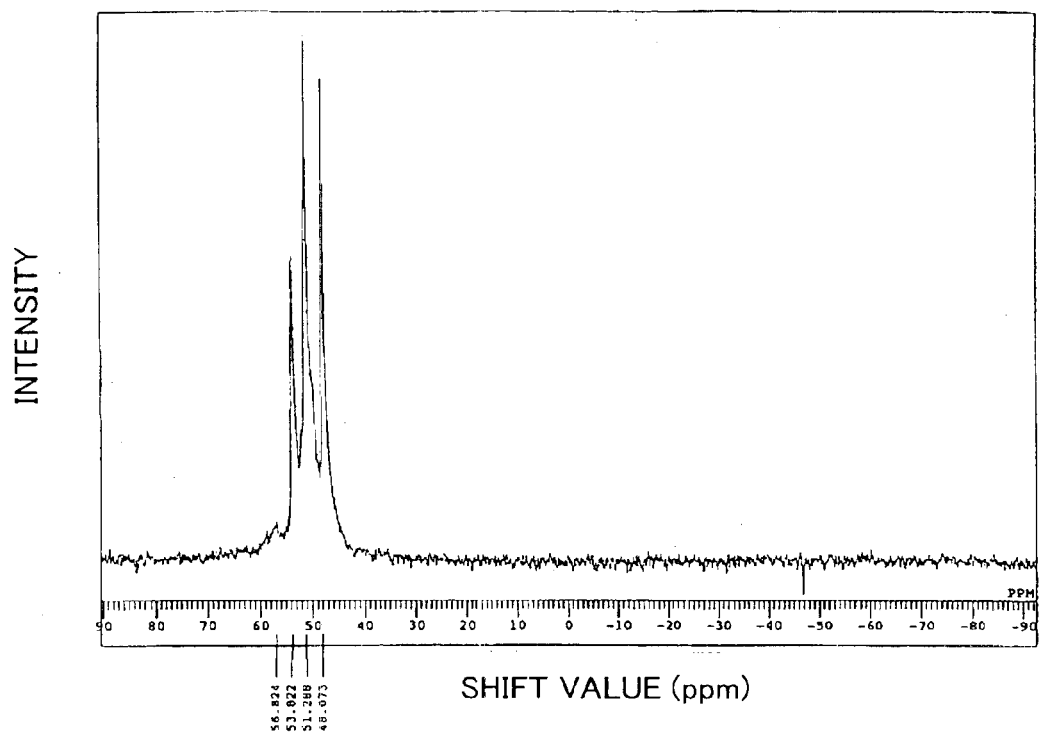
FIG. 11 shows a chart illustrating $^{31}$P-NMR for Impregnation solution 8584.

FIGS. 9 and 10 show results of the measurement of NMR spectrums of Impregnation solutions 9064 and 9066 respectively. As understood from FIG. 9, only a broad spectrum at about 17.2 ppm generally appeared for the Impregnation solution 9064. Further, as understood from FIG. 10, only a broad spectrum at about 19.2 ppm generally appeared for the Impregnation solution 9066. It is considered that the results of the spectrums are based on the fact that the complex including molybdenum, nickel and phosphorus was also formed as a result of the addition of nickel citrate to the phosphomolybdic acid solution in Impregnation solutions #9064 and 9066, and free phosphorus was scarcely present in the impregnation solution. FIG. 11 shows a result of the measurement of an NMR spectrum of Impregnation solution 8584. In this spectrum, sharp signals were observed at 56.8, 51.3, and 48.1 ppm. That is, the signal based on phosphomolybdic acid at not more than 0.3 ppm disappeared, and only the signals at not less than 0.4 ppm appeared, probably for the following reason. That is, the complex including molybdenum, phosphorus and cobalt was formed as a result of the addition of cobalt citrate to the aqueous solution of 12-molybdo(VI)phosphoric acid n-hydrate, and free phosphorus was scarcely present in the impregnation solution.

Preparation of Catalyst

The catalyst carriers were impregnated with the impregnation solutions shown in Table 1 and Impregnation solution 3429 by means of the pore-filling method respectively. The catalyst carrier had a form of 1/32", cylinder pellets containing a major component of γ-alumina. The specific surface area, which was measured by the nitrogen gas adsorption method, was 250 to 255 $m^2/g$, and the pore volume was 0.72 to 0.74 $cm^3/g$ within a pore diameter range of 5 to 50 nm. The impregnated materials were dried overnight at 130° C., followed by calcination at 450° C. for 25 minutes in air by using a ventilation type rotary kiln to prepare catalysts (Catalyst 9039, Catalyst 9063, Catalyst 9064, Catalyst 9066, Catalyst 9069, Catalyst 9070, Catalyst 9072, Catalyst 9075, and Catalyst 3429). Further, Catalyst Solution 9039 was used to prepare three catalysts (Catalyst 9050, Catalyst 9051, and Catalyst 9052) under the same condition as described above except that the calcination was not performed with the rotary kiln (not calcinated), that the calcination was performed at a calcination temperature of 350° C., and that the calcination was performed at a calcination temperature of 500° C. Tables 3 and 4 summarize the impregnation solution of each of the catalysts, the calcination temperature, the specific surface area measured by the nitrogen gas adsorption method, the pore volume within the pore diameter range of 5 to 50 nm, the median pore diameter, the content of impregnated metal, and the content of carbon. The unit of the specific surface area is $m^2/g$, the unit of the pore volume is $cm^3/g$, and the unit of the median pore diameter is nm.

The catalyst carrier was impregnated with Impregnation solution 8584 shown in Table 2 by means of the pore-filling method. The catalyst carrier had a 1/20" trilobe pellet-shaped form comprising γ-alumina and silica-alumina containing a major component of γ-alumina. The specific surface area, which was measured by the nitrogen gas adsorption method, was 260 to 265 $m^2/g$, and the pore volume was 0.60 to 0.65 $cm^3/g$ within a pore diameter range of 5 to 50 nm. The impregnated material was dried overnight at 130° C., followed by calcination at 450° C. for 30 minutes in air by using a ventilation type rotary kiln to prepare Catalyst 8584.

The catalyst carrier was impregnated with Impregnation solution 8585 shown in Table 2 by means of the pore-filling method. The catalyst carrier had a 1/20" trilobe pellet-shaped form comprising only γ-alumina. The specific surface area, which was measured by the nitrogen gas adsorption method, was 245 to 250 $m^2/g$, and the pore volume was 0.55 to 0.60 $cm^3/g$ within a pore diameter range of 5 to 50 nm. The impregnated material was dried overnight at 130° C., followed by calcination at 450° C. for 30 minutes in air by using a ventilation type rotary kiln to prepare a catalyst (Catalyst 8585).

Table 5 summarizes the impregnation solution of each of the catalysts, the calcination temperature, the specific surface area measured by the nitrogen gas adsorption method, the pore volume within the pore diameter range of 5 to 50 nm, the median pore diameter, the content of impregnated metal, and the result of the evaluation of the catalyst activity described later on. The unit of the specific surface area is $m^2/g$, the unit of the pore volume is $cm^3/g$, and the unit of the median pore diameter is nm.

TABLE 3

| | Catalyst # | | | | | | | |
|---|---|---|---|---|---|---|---|---|
| | #9039 | #9063 | #9064 | #9066 | #9069 | #9070 | #9072 | #9075 |
| | Impregnation solution # | | | | | | | |
| | #9039 | #9063 | #9064 | #9066 | #9069 | #9070 | #9072 | #9075 |
| Calcination temperature (° C.) | 450 | 450 | 450 | 450 | 450 | 450 | 450 | 450 |
| Specific surface area | 229 | 228 | 221 | 228 | 228 | 230 | 229 | 236 |
| Pore volume | 0.59 | 0.59 | 0.59 | 0.58 | 0.59 | 0.59 | 0.59 | 0.59 |

TABLE 3-continued

| | Catalyst # | | | | | | | |
|---|---|---|---|---|---|---|---|---|
| | #9039 | #9063 | #9064 | #9066 | #9069 | #9070 | #9072 | #9075 |
| | Impregnation solution # | | | | | | | |
| | #9039 | #9063 | #9064 | #9066 | #9069 | #9070 | #9072 | #9075 |
| Median pore diameter | 9.5 | 9.9 | 9.9 | 9.6 | 9.7 | 9.3 | 9.3 | 9.3 |
| Mo (mass %) | 8.0 | 8.2 | 8.2 | 8.1 | 8.1 | 8.2 | 8.3 | 8.2 |
| Ni (mass %) | 2.2 | 2.5 | 2.6 | 2.9 | 1.5 | 2.0 | 2.0 | 2.0 |
| P (mass %) | 0.28 | 0.30 | 0.39 | 0.29 | 0.29 | 0.30 | 0.30 | 0.30 |
| Carbon (mass %) | 0.10 | 0.11 | 0.05 | 0.06 | 0.10 | 0.11 | 0.08 | 0.12 |
| Sulfur concentration in produced oil | | | | | | | | |
| 360° C. | 0.885 | 0.895 | 0.870 | 0.904 | 0.977 | 0.917 | 0.907 | 0.970 |
| 380° C. | 0.455 | 0.476 | 0.468 | 0.473 | 0.521 | 0.475 | 0.464 | 0.531 |
| Reaction rate constant | | | | | | | | |
| 360° C. | 2.91 | 2.83 | 2.92 | 2.79 | 2.54 | 2.75 | 2.80 | 2.54 |
| 380° C. | 6.41 | 6.11 | 6.24 | 6.13 | 5.51 | 6.09 | 6.27 | 5.39 |
| Relative activity | 118 | 113 | 116 | 113 | 102 | 112 | 114 | 101 |

TABLE 4

| | Catalyst # | | | | | |
|---|---|---|---|---|---|---|
| | #3429 | #9050 | #9051 | #9052 | #9123 | #9088 |
| | Impregnation solution # | | | | | |
| | #3429 | #9039 | #9039 | #9039 | two-stage | two-stage |
| Calcination temperature (° C.) | 450 | none | 350 | 500 | 450 | 450 |
| Specific surface area | 232 | 198 | 228 | 229 | 243 | 229 |
| Pore volume | 0.59 | 0.51 | 0.58 | 0.59 | 0.61 | 0.57 |
| Median pore diameter | 9.7 | 9.3 | 9.3 | 9.7 | 9.1 | 9.5 |
| Mo (mass %) | 8.0 | 7.4 | 8.0 | 8.1 | 7.6 | 8.0 |
| Ni (mass %) | 2.3 | 2.0 | 2.2 | 2.2 | 2.2 | 2.3 |
| P (mass %) | 0.36 | 0.26 | 0.29 | 0.29 | ND | 1.0 |
| Carbon (mass %) | 0.05 | 1.73 | 0.56 | 0.10 | ND | 0.06 |
| Sulfur concentration in produced oil | | | | | | |
| 360° C. | 0.863 | 0.946 | 0.961 | 0.924 | 0.989 | 0.923 |
| 380° C. | 0.459 | 0.491 | 0.505 | 0.475 | 0.523 | 0.512 |
| Reaction rate constant | | | | | | |
| 360° C. | 2.98 | 2.68 | 2.57 | 2.75 | 2.48 | 2.72 |
| 380° C. | 6.40 | 5.87 | 5.66 | 6.1 | 5.44 | 5.58 |
| Relative activity | 119 | 108 | 104 | 112 | 100 | 106 |

TABLE 5

| | Catalyst # | |
|---|---|---|
| | #8584 | #8585 |
| | Impregnation solution # | |
| | #8584 | #8584 |
| Calcination temperature (° C.) | 450 | 450 |
| Specific surface area | 216 | 180 |
| Pore volume | 0.463 | 0.380 |
| Median pore diameter | 75.9 | 71.5 |
| Mo (mass %) | 12.3 | 11.4 |
| Co (mass %) | 3.3 | 3.1 |
| P (mass %) | 0.35 | 0.33 |
| Sulfur concentration in produced oil | | |
| 320° C. | 2230 | 2060 |
| 330° C. | 1300 | 1180 |
| 340° C. | 651 | 603 |
| 350° C. | 281 | 255 |

For the purpose of comparison, Catalyst 9123 and Catalyst 9088 were prepared. The characteristics of these catalysts are shown in Table 4. These catalyst were prepared as follows. 17.3 g of ammonium heptamolybdate $(NH_4)_4Mo_7O_{24} \cdot 4H_2O$ produced by Wako Pure Chemical Industries, Ltd. was dissolved by adding ion exchange water to obtain a solution to which 7.6 g of a 28% by weight of ammonium solution produced by Kanto Chemical Co., Ltd. was added to prepare a solution which was diluted to have a solution amount corresponding to a water absorption amount of 100 g of the catalyst carrier. 100 g of the catalyst carrier was impregnated with the solution by means of the pore-filling method. The impregnated material was dried overnight at 130° C., and then ion exchange water was added to 12.8 g of nickel nitrate: Ni(NO$_3$)$_2$.6H$_2$O produced by Kanto Chemical Co., Ltd., followed by being dissolved to obtain a solution which was diluted to have a solution amount corresponding to a water absorption amount of the dried matter. The dried matter was impregnated again with the solution by means of the pore-filling method. That is, the carrier was impregnated with the impregnation solution in the two stages in a divided manner. The impregnated material was dried overnight at 130° C., followed by calcination at 450° C. for 25 minutes in air by using a ventilation type rotary kiln to prepare Catalyst 9123.

17.8 g of ammonium heptamolybdate (NH$_4$)$_4$Mo$_7$O$_{24}$.4H$_2$O produced by Wako Pure Chemical Industries, Ltd. was dissolved by adding ion exchange water to obtain a solution to which 7.8 g of a 28% by weight of ammonium solution produced by Kanto Chemical Co., Ltd. was added to prepare a solution which was diluted to have a solution amount corresponding to a water absorption amount of 100 g of the catalyst carrier. 100 g of the catalyst carrier was impregnated with the solution by means of the pore-filling method. The impregnated material was dried overnight at 130° C., and then ion exchange water was added to 13.1 g of nickel nitrate: Ni(NO$_3$)$_2$.6H$_2$O produced by Kanto Chemical Co., Ltd., followed by being dissolved to obtain a solution which was added with 4.5 g of phosphoric acid produced by Kanto Chemical Co., Ltd. to obtain a solution which was diluted to have a solution amount corresponding to a water absorption amount of the dried matter. The dried matter was impregnated again with the solution by means of the pore-filling method. Also in this case, the carrier was impregnated with the impregnation solution in the two stages in a divided manner. The impregnated material was dried overnight at 130° C., followed by calcination at 450° C. for 25 minutes in air by using a ventilation type rotary kiln to prepare Catalyst 9088.

Analysis of Catalyst

The pore characteristics of the catalysts prepared as described above were measured with the ASAP 2400 type produced by Micromeritics. Tables 3, 4, and 5 summarize the surface area, the pore volume within the pore diameter range of 5 to 50 nm, and the median pore diameter of the catalyst together with the amount of impregnated metal and the content of carbon element.

Catalysts 9039, 9063, 9064, 9066, 3429, and 9088 were cut perpendicularly in the length direction of the pellet form. The analysis was performed for the substantially circular cross section with an EPMA (electron beam probe microanalyzer) apparatus (scanning type JCMA 33 system produced by JEOL Ltd.). In the EPMA measurement, the electron beam was radiated onto the cross section at an acceleration voltage of 20 kV with a probe current of 0.1 μA and a beam diameter of 10 μmφ. The generated characteristic X-ray was measured to investigate the distributions of Mo, Ni, Al, and P. The intensity ratios of Mo/Al, Ni/Al, P/Al, and Ni/Mo were obtained at every interval of 0.01 mm over a range from one outer edge to another outer edge disposed at the other end in the diametral direction. Table 6 shows values each of which was obtained by dividing the standard deviation by the average value. According to the result shown in Table 6, it is understood that phosphorus is uniformly distributed in the carrier in Catalysts #9039, 9063, 9064, 9066, and 3429 obtained by the method of the present invention as compared with Catalyst 9088.

TABLE 6

| | Catalyst # | | | | | |
|---|---|---|---|---|---|---|
| | #9039 | #9063 | #9064 | #9066 | #3429 | #9088 |
| Mo/Al | 0.107 | 0.137 | 0.125 | 0.211 | 0.099 | 0.118 |
| Ni/Al | 0.082 | 0.084 | 0.061 | 0.082 | 0.091 | 0.119 |
| P/Al | 0.075 | 0.066 | 0.073 | 0.070 | 0.167 | 0.508 |
| Ni/Mo | 0.058 | 0.081 | 0.094 | 0.160 | 0.055 | 0.053 |

Evaluation of Catalyst Activity

Hydrorefining experiments were performed with a feed oil of atmospheric distillation residue originating from the Middle East by using the catalysts shown in Tables 3 and 4. The feed oil had the following properties. That is, the conradson carbon content was 9.7% by weight, the density was 0.9713 g/cm$^3$, the sulfur content was 3.880% by weight, and the nitrogen content was 2120 ppm by weight. The hydrorefining reaction was performed by using a reactor having a diameter of 2.5 cm and a length of 100 cm charged with 100 cm$^3$ of the catalyst, and the sulfurization treatment was performed with oil obtained by dissolving carbon disulfide in gas oil by 1% by weight. The hydrorefining reaction condition was as follows. That is, the hydrogen purity was not less than 99.9%, the hydrogen pressure was 14.0 MPa, the liquid space velocity was 1.0 hr$^{-1}$, and the hydrogen/oil ratio was 1000 NL/L. The sulfur contents in the produced oils obtained at reaction temperatures of 360° C. and 380° C. were analyzed to obtain the values shown in Tables 3 and 4 by % by weight. The reaction rate constant of the desulfurization reaction was determined for each of the catalysts assuming that the second order reaction of the desulfurization was quadratic. Results of the comparison with the reference (100) of Catalyst #9123 are also shown in Tables 3 and 4.

Hydrorefining experiments were performed with a feed oil of straight run gas oil originating from the Middle East by using Catalysts #8584 and 8585 shown in Table 5. The feed oil had the following properties. That is, the 50% distillation temperature was 310° C., the 90% distillation temperature was 353° C., the density was 0.8604 g/cm$^3$, the sulfur content was 1.72% by weight, and the nitrogen content was 216 ppm by weight. The hydrorefining reaction was performed by using a reactor having a diameter of 2.5 cm and a length of 100 cm charged with 100 cm$^3$ of the catalyst, and the sulfurization treatment was performed with oil obtained by dissolving carbon disulfide in gas oil by 1% by weight. The hydrorefining reaction condition was as follows. That is, the hydrogen purity was not less than 99.9%, the hydrogen pressure was 5.0 MPa, the liquid space velocity was 2.0 hr$^{-1}$, and the hydrogen/oil ratio was 200 NL/L. The sulfur contents in the produced oils obtained at reaction temperatures of 320° C., 330° C., 340° C., and 350° C. were analyzed. Obtained values are shown by ppm by weight in Table 5.

Evaluation of Catalyst Life

Figure 12:
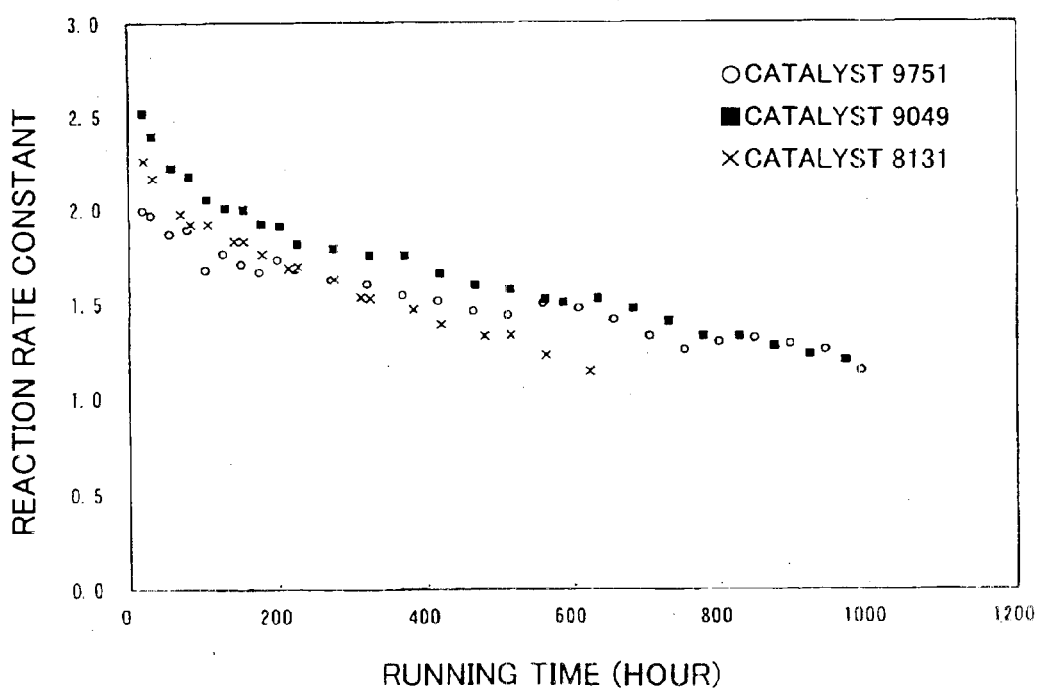
FIG. 12 shows a graph illustrating the change of the reaction rate constant depending on the running time for Catalysts 9049, 9751, and 8131.

Catalyst 9049 (Working Example) prepared in the same manner as Catalyst 9039, Catalyst 9751 (Comparative Example) prepared in the same manner as Catalyst 9123, and Catalyst 8131 (Comparative Example) prepared in the same manner as Catalyst 9088 were used to perform hydrorefining experiments by using a feed oil of Ratawi heavy oil in order to evaluate the catalyst life. Table 7 summarizes the characteristics of these catalysts. The properties of the feed oil were as follows. That is, the conradson carbon content was 21.6% by weight, the density was 1.03 g/cm$^3$, the sulfur content was 5.64% by weight, the vanadium content was 127 ppm by weight, and the nickel content was 49 ppm by weight. The hydrorefining reaction was performed by using two cascade-connected reactors each having a diameter of 2.5 cm and a length of 100 cm charged with 100 cm$^3$ of the catalyst, and the sulfurization treatment was performed with oil obtained by dissolving carbon disulfide in gas oil by 1% by weight. The hydrorefining reaction condition was as follows. That is, the hydrogen purity was not less than 99.9%, the hydrogen pressure was 14.0 MPa, the liquid space velocity was 0.5 hr$^{-1}$, and the hydrogen/oil ratio was 1000 NL/L. The hydrodesulfurization reaction was performed at a reaction temperature of 390° C. The activity of the hydrodesulfurization catalyst is lowered by the poisoning of heavy metal such as nickel and vanadium principally contained in the feed oil. Therefore, this experiment is suitable for the purpose to evaluate the life of the hydrodesulfurization catalyst in a short period. The desulfurization activity is represented by the second rate reaction rate constant, and the change depending on the running time is shown in FIG. 12. Although the initial desulfurization activity of Catalyst 9049 was higher than that of Catalyst 9751 by about 25%, the life of the former was approximately equivalent to the life of the latter. Although the initial desulfurization activity of Catalyst 8131 was higher than that of Catalyst 9751 by about 15%, the activity was conspicuously lowered.

TABLE 7

|  | Catalyst # | | |
| --- | --- | --- | --- |
|  | #9049 | #9751 | #8131 |
| Calcination temperature (° C.) | 450 | 450 | 450 |
| Specific surface area | 230 | 252 | 211 |
| Pore volume | 0.60 | 0.62 | 0.55 |
| Median pore diameter | 93 | 91 | 95 |
| Mo (mass %) | 8.0 | 7.9 | 8.2 |
| Ni (mass %) | 2.1 | 2.2 | 2.4 |
| P (mass %) | 0.29 | ND | 1.1 |
| Carbon (mass %) | 0.10 | ND | ND |

INDUSTRIAL APPLICABILITY

The hydrorefining catalyst obtained by the method of the present invention exhibits the excellent catalyst activity and the excellent catalyst life in the hydrorefining.

What is claimed is:

1. A method for producing a hydrorefining catalyst containing cobalt and/or nickel, molybdenum, and phosphorus by bringing an impregnation solution into contact with a carrier formed of inorganic porous oxide, the method comprising:

preparing, without using any oxidizing agent and reducing agent, the impregnation solution containing cobalt and/or nickel, molybdenum, phosphorus, and citric acid in which a molar ratio of molybdenum/phosphorus is 6 to 13, a molar ratio of (cobalt and nickel)/phosphorus is 0.5 to 7, and a molar ratio of (cobalt and nickel)/citric acid is 0.5 to 2;

bringing the carrier into contact with the impregnation solution; and calcinating the carrier having been brought into contact with the impregnation solution, in an oxidizing atmosphere at a temperature at which citric acid is removed, wherein a Raman spectroscopy spectrum of the impregnation solution has a peak between 940 cm$^{-1}$ to 950 cm$^{-1}$.

2. The method for producing the hydrorefining catalyst according to claim 1, wherein:

a Raman spectroscopy spectrum of the impregnation solution has peak between 940 cm$^{-1}$ to 950 cm$^{-1}$; and between 970 cm$^{-1}$ to 980 cm$^{-1}$ respectively; and a molar ratio of molybdenum/phosphorus in the impregnation solution is 8 to 13.

3. The method for producing the hydrorefining catalyst according to claim 1, wherein a $^{31}$P-NMR spectrum of the impregnation solution has a peak at not less than 0.4 ppm provided that a chemical shift value of $H_3PO_4$ is 0 ppm.

4. The method for producing the hydrorefining catalyst according to claim 1, wherein the impregnation solution is prepared with phosphomolybdic acid and citrate of cobalt and/or nickel.

5. The method for producing the hydrorefining catalyst according to claim 1, wherein the impregnation solution is prepared with phosphomolybdic acid, citric acid, and carbonate of cobalt and/or nickel.

6. The method for producing the hydrorefining catalyst according to claim 1, wherein the impregnation solution is prepared with molybdenum trioxide; phosphoric acid; and at least one of a combination of carbonate of cobalt and/or nickel and citric acid, and citrate of cobalt and/or nickel.

7. The method for producing the hydrorefining catalyst according to claim 2, wherein the impregnation solution is prepared with 12-molybdophosphoric acid hydrate; and at least one of a combination of carbonate of cobalt and/or nickel and citric acid, and citrate of cobalt and/or nickel.

8. The method for producing the hydrorefining catalyst according to claim 1, wherein a molar ratio of molybdenum/phosphorus in the impregnation solution is 6.5 to 11.5.

9. The method for producing the hydrorefining catalyst according to claim 1, wherein an ultraviolet visible spectrum of the impregnation solution has transmittance of not less than 90% at wavelength of 500–550 nm or 650–700 nm.

10. The method for producing the hydrorefining catalyst according to claim 1, wherein the catalyst contains molybdenum by a metal element weight of 3 to 20% by weight, cobalt and/or nickel by a metal element weight of 1 to 8% by weight, and phosphorus by a phosphorus element weight of 0.05 to 5% by weight.

* * * * *